United States Patent [19]

Peli

[11] Patent Number: 5,109,282
[45] Date of Patent: Apr. 28, 1992

[54] HALFTONE IMAGING METHOD AND APPARAUTS UTILIZING PYRAMIDOL ERROR CONVERGENCE

[75] Inventor: Eli Peli, Newton, Mass.

[73] Assignee: Eye Research Institute of Retina Foundation, Boston, Mass.

[21] Appl. No.: 540,685

[22] Filed: Jun. 20, 1990

[51] Int. Cl.$^5$ .......................... H04N 1/23; H04N 1/40
[52] U.S. Cl. ..................................... 358/298; 358/443; 358/458; 358/465; 358/466
[58] Field of Search ............... 358/298, 443, 455, 456, 358/457, 458, 463, 465, 466

[56] References Cited

U.S. PATENT DOCUMENTS

| | | | |
|---|---|---|---|
| 4,339,774 | 7/1982 | Temple | 358/456 |
| 4,384,336 | 5/1983 | Frankle et al. | 382/49 |
| 4,742,399 | 5/1988 | Kitamura | 358/466 X |
| 4,750,211 | 6/1988 | Wray | 382/41 |
| 4,876,611 | 10/1989 | Fischer et al. | 358/456 |
| 4,878,125 | 10/1989 | Katayama | 358/443 |
| 4,920,501 | 4/1990 | Sullivan et al. | 358/463 X |
| 4,924,322 | 5/1990 | Kurosawa et al. | 358/463 X |
| 4,975,786 | 12/1990 | Katayama et al. | 358/459 |

OTHER PUBLICATIONS

Jarvis et al., "A Survey of Techniques for the Display of Continuous Tone Pictures on Bilevel Displays," *Computer Graphics and Image Processing*, vol. 5, pp. 13-40, 1976.

Jarvis et al., "A New Technique for Displaying Continuous Tone Images on a Bilevel Display," *IEEE Transactions on Communications*, pp. 891-898, Aug. 1976.

Peli, "Visual Issues in the Use of Head Mounted Displays," *Proceedings of the SPIE*, vol. 1099, Visual Communications and Image Processing IV, 1989.

Roetling, "Quality Measures in Digital Halftones," Optical Soc. of Am., Washington, D.C., Topical Meeting on Applied Vision, 1989, *Technical Digest Series*, vol. 16, pp. 59-62.

Roetling, "Halftone Method with Edge Enhancement and Moire Suppression," *JOSA*, vol. 66, pp. 985-989, 1976.

Roetling, "Visual Performance and Image Coding," *SPIE*, vol. 74 (Image Processing) p. 195, 1976.

Saghri et al., "Personal Computer Based Image Processing with Halftoning," *Opto Eng.*, vol. 25, pp. 499-504, 1986.

Ulichney, "Dithering with Blue Noise," *Proceedings of the IEEE*, vol. 76, No. 1, Jan. 1988, pp. 56-79.

Ulichney, "Digital Halftoning," *MIT Press*, Cambridge, Mass., 1987.

Hou, "Digital Halftoning and Shading in Digital Document Processing," *John Wiley & Sons*, N.Y., 1983, pp. 83-115.

Bayer, "An Optimum Method for Two Level Rendition of Continuous-Tone Pictures," *Proc. IEEE Int. Conf. on Communications, Conf. Rec.*, pp. 26-11, 26-15, 1973.

Floyd et al., "Adaptive Algorithm for Spatial Gray Scale," *Proc. SID*, vol. 17, pp. 75-77, 1976.

Carlsohn et al., "Adaptive Selection of Threshold Matrix Size for Pseudogray Rendition of Images," *Optical Engineering*, vol. 24(4), pp. 655-662, Jul.-Aug. 1985.

Anastassiou et al., "Progressive Halftoning of Images," *Electronics Letters*, vol. 24, pp. 489-490, 1988.

*Primary Examiner*—Benjamin R. Fuller
*Assistant Examiner*—Eric Frahm
*Attorney, Agent, or Firm*—Lahive & Cockfield

[57] ABSTRACT

Apparatus and methods for converting continuous grey tone images into high resolution halftone images utilize an iterative, multi-level, multi-resolution error convergence process. The continuous grey tone image is first binarized. At each level of the process, the binarized image is compared with the grey tone image over a larger window of pixels. Within each window, selected binarized image pixels are tested for possible change in binary assignment. The binary assignment of a given test pixel is changed if the change would result in a lower average error over the entire window. By varying the selection of test pixels, the process can provide clustered dot patterns and dithering.

(List continued on next page.)

3 Claims, 18 Drawing Sheets

OTHER PUBLICATIONS

Anastassiou et al., "Digital Image Halftoning Using Neural Networks," *SPIE Visual Communications and Image Processing,* vol. 1001, pp. 1062-1068, 1988.

Allebach and Liu, "Random Quasiperiodic Halftone Process," *Journal of the Optical Society of America,* vol. 66, No. 9, pp. 909-917, Sep. 1966.

Brightfield, "A One-Chip Real-Time Convolution Solution," *FSD: The Electronic System Design Magazine,* pp. 47-52, May 1989.

Goldstein et al., "Medical Image Communication Using Halftone Algorithms," (unpublished).

Stevenson and Arce, "Binary Display of Hexagonally Continuous-Tone Images," *Journal of the Optical Society of America,* vol. 2, No. 7, pp. 1009-1013, Jul. 1985.

Werman and Peleg, "Halftoning as Optimal Quantization", *Center for Automation Research, University of Maryland,* Jan. 1986.

*Sundial,* vol. 14, No. 4, Dotti, ed., Eye Research Institute of Retina Foundation, Dec. 1988, pp. 6-9.

Independent Living Aids, Plainview, N.Y., (Product Catalog), advertises portable electronic magnifying viewers.

| 3 | | 3 | | 3 | | 3 | | 3 | | 3 | | 3 |
|---|---|---|---|---|---|---|---|---|---|---|---|---|
| | 5 | | 7 | | 5 | | 7 | | 5 | | 7 | |
| 3 | | 3 | | 3 | | 3 | | 3 | | 3 | | 3 |
| | | | 5 | | 9 | | 5 | | | | 5 | |
| 3 | | 3 | | 3 | | 3 | | 3 | | 3 | | 3 |
| | 5 | | 7 | | 5 | | 7 | | 5 | | 7 | |
| 3 | | 3 | | 3 | | 3 | | 3 | | 3 | | 3 |
| | 9 | | 5 | | | | 5 | | 9 | | 5 | |
| 3 | | 3 | | 3 | | 3 | | 3 | | 3 | | 3 |
| | 5 | | 7 | | 5 | | 7 | | 5 | | 7 | |
| 3 | | 3 | | 3 | | 3 | | 3 | | 3 | | 3 |
| | | | 5 | | 9 | | 5 | | | | 5 | |
| 3 | | 3 | | 3 | | 3 | | 3 | | 3 | | 3 |
| | 5 | | 7 | | 5 | | 7 | | 5 | | 7 | |
| 3 | | 3 | | 3 | | 3 | | 3 | | 3 | | 3 |
| | 9 | | 5 | | | | 5 | | 9 | | 5 | |
| 3 | | 3 | | 3 | | 3 | | 3 | | 3 | | 3 |
| | 5 | | 7 | | 5 | | 7 | | 5 | | 7 | |

HALFTONE IMAGING METHOD AND APPARAUTS UTILIZING PYRAMIDOL ERROR CONVERGENCE

BACKGROUND OF THE INVENTION

This invention relates generally to systems for image processing, and, more particularly, relates to apparatus and methods for visually enhanced depiction of multi-valued grey tone images on binary display devices or print media.

Digital halftoning methods and apparatus have gained considerable attention in recent years. These techniques are widely used for rendering "continuous tone" or multi-valued grey tone images on binary display devices or printers. When applied to a continuous tone image, halftoning generates a binary image in which the average density locally simulates that of the continuous tone image. Digital halftoning is frequently utilized in the desktop publishing field, in connection with computers that prepare images for printing. Due to the limited resolution of conventional laser printers—typically 300 dots per inch—the visual quality of laser-printed halftone images is dependent upon the method used to process the image.

In addition to printing, halftone images are used to display visual information on computer binary monitors and other bi-level displays. Such display devices are discussed in Jarvis et al, "A Survey of Techniques for the Display of Continuous Tone Pictures On Bilevel Displays," *Computer Graphics and Image Processing*, Vol. 5, pp. 13-40, 1976. The advent of miniature, head-mounted binary display devices of moderate resolution has also generated increased interest in halftoning methods and apparatus. See Peli, "Visual Issues in the Use of Head Mounted Display," *Proceedings of the SPIE*, Vol. 1099, Visual Communication and Image Processing IV, 1989).

Additionally, the continuing development of telecopiers, picture phones and other systems involving high-speed transmission of visual images over limited bandwidth communication channels has augmented the need for enhanced halftone imaging. Halftoning techniques provide data compaction by generating a compressed form of visual information suitable for efficient transmission over limited capacity channels. This application of halftoning is discussed in Roetling, "Quality Measures in Digital Halftones", Optical Soc. of Am., Washington, D.C., Topical Meeting on Applied Vision, 1989, *Technical Digest Series*, Vol. 16, pp. 59-62; and Anastassiou et al., "Digital Image Halftoning Using Neural Networks," *SPIE Visual Communications and Image Processing*, Vol. 1001, pp. 1062-1068, 1988.

Conventional halftone methods impose a compromise between spatial resolution and dynamic range—i.e., the number of grey tones represented—and the necessity of maintaining visually pleasing image texture and perceived roughness. This compromise is discussed in Saghri et al., "Personal Computer Based Image Processing With Halftoning," *Opt. Eng.*, Vol. 25, pp. 499-504, 1986; and Ulichney, "Dithering With Blue Noise," Proceedings of the IEEE, Vol. 76, No. 1, January 1988, pp. 56-79.

Visually acceptable output images can be obtained through conventional digital halftoning methods if extremely high resolution displays or printers are available. However, when commonly available, moderate-resolution printers or displays are employed, conventional methods produce output images with objectionable visual artifacts. These artifacts can result from limited dynamic range or limited spatial resolution in the output image.

Halftoning methods can be divided into four categories: (1) dithering techniques, (2) constrained average or edge emphasis techniques, (3) error diffusion or propagation techniques, and (4) adaptive methods. A review of the first three classes and a comparison of their performance is found in Jarvis et al., cited above.

Dither halftoning methods generate a binary image by comparing the original image value to a position dependent set of thresholds within a small repeated cell containing an $N \times N$ array of pixels. This technique is discussed in Hou, *Digital Halftoning and Shading in Digital Document Processing*, John Wiley & Sons, New York, 1983, pp. 83-115. The selection of the threshold values and the positions of the threshold values within the cell determines the type of dither technique. In particular, the position of the threshold values within a cell can be random or ordered, and the position of the dots within the ordered screen can be dispersed across the cell or clustered together.

In applications utilizing printers or other devices in which the fidelity of single dot reproduction is low, clustered dots and ordered screens produce better results than do dispersed dots and random screens. In clustered dot methods, diagonally oriented patterns are preferred because of the limited sensitivity of the human visual system (HVS) to diagonal patterns. This is discussed in Ulichney, *Digital Halftoning*, MIT Press, Cambridge, Mass., 1987.

Dispersed dots and ordered screens are preferred for use with devices having reliable dot reproduction, because dispersed dots provide increased spatial resolution at a given dynamic range of gray levels. One method of dispersing the dots is proposed in Bayer, "An Optimum Method for Two Level Rendition of Continuous-Tone Pictures," *Proc. IEEE Int. Conf. on Communications, Conf. Rec.*, pp. 26-11, 26-15, 1973. The Bayer method alternates horizontal, vertical, or diagonal points at each gray step. A significant limitation of the Bayer method of dispersed-dot dithered halftoning, however, is the distinct visibility of certain textures that produce the appearance of false contours in some images.

Constrained average methods typically provide greater apparent resolution than that afforded by dither techniques, with a consequent reduction in aliasing. These methods are discussed in Roetling, "Halftone Method with Edge Enhancement and Moire Suppression," *JOSA*, Vol. 66, pp. 985-989, 1976; and in Jarvis et al., "A New Technique for Displaying Continuous Tone Images on a Bilevel Display", *IEEE Transactions on Communications*, August 1976, pp. 891-898. Constrained average techniques enhance the appearance of edges by calculating local averages and adjusting the dither threshold value locally. The effect is equivalent to locally reducing the modulation of the halftone screen, which reduces the number of possible gray levels. In the Roetling method, local averaging is performed over the binary images and the original image. Jarvis et al. perform local averaging over the original image only.

Error diffusion or error propagation methods utilize no fixed, repeated cell of pixels. Instead, these techniques involve pixel-by-pixel gray scale control processes, in which selected gray tone pixel values are switched from black to white or from white to black. See Floyd et al., "Adaptive Algorithm for Spatial Grey Scale," *Proc. SID.* Vol. 17, pp. 75-77, 1976. Each time a gray tone pixel value is switched to white or black, a local error in the gray scale is generated. The error is then redistributed among local pixels to correct the image. This approach tends to increase dynamic range and provide enhanced spatial resolution, thereby suppressing aliasing. See Saghri et al., cited above. Error propagation techniques are inherently serial, with error values being determined solely on the basis of previously-processed pixel values.

Ulichney (1988), cited above, addresses various methods for implementing the error propagation technique, in order to select the approach most suitable for representing a region of uniform gray level. Optimum results are obtained when the output image has certain blue noise characteristics. This effect can be achieved by modifying the basic error propagation method with a serpentine raster and Floyd filtering with fifty percent random weights. See Floyd, cited above. When the error propagation process is executed on a serpentine raster, the cumulative error determination is limited to no more than half of the neighborhood of any point. This process reduces the apparent texture patterns that appear when the unmodified error propagation technique is used.

Although error propagation methods can provide acceptable results, the computational complexity of the method increases with the area over which the error is permitted to propagate. This complexity, combined with the inherent serial execution of the method, results in excessive processing time, even for moderate size images.

Recently proposed systems for enhancing the speed and quality of halftone image generation include adaptive coding, progressive coding, and parallel processing. Adaptive coding systems assign additional gray levels are to areas of an image having low spatial frequency content, while assigning fewer gray levels to areas of high spatial frequency. An example is discussed in Carlson et al., "Adaptive Selection of Threshold Matrix Size for Pseudogray Rendition of Images," *Optical Engineering,* Vol. 24(4), pp. 655-662, July-August, 1985.

Adaptive coding is based upon differences in the number of grey levels that the human visual system can detect at each spatial frequency. These differences, and the corresponding desirability of locally varying the resolution and dynamic range of halftone images, is analyzed in Roetling, "Quality Measures in Digital Halftones", Optical Soc. of Am., Washington, D.C., Topical Meeting on Applied Vision, 1989, *Technical Digest Series,* Vol. 16, pp. 59-62; and Roetling, "Visual Performance and Image Coding," *SPIE,* Vol. 74 ("Image Processing") pg. 195 (1976).

Progressive coding systems divide each image into different classes of images at various resolutions. The various classes are progressively coded or binarized, and the binarization may be performed in parallel within each class of images, based on values of previously calculated classes. The process combines aspects of the ordered dither method and the error propagation technique, as each position threshold is determined on the basis of error values propagated from previously processed neighboring pixels. Progressive coding is analyzed in Anastassiou et al., "Progressive Half-toning of Images," *Electronics Letters,* Vol. 24, pp. 489-490, 1988.

The same authors propose a symmetric error diffusion neural network in which error values from all neighboring points are applied to calculate the binary value at a central point. The process is parallel and recursive in nature, and is intended to be implemented in neural net devices. See Anastassiou, et al., "Digital Image Halftoning Using Neural Networks," *SPIE Visual Communications and Image Processing,* Vol. 1001, pp. 1062-1068, 1988.

Conventional adaptive or progressive coding systems, however, typically do not provide sufficient processing speed for real-time halftone image generation. Moreover, the error diffusion neural network system requires a complex array of special-purpose digital processors. Such networks are expensive and not widely available.

It is accordingly an object of the invention to provide improved halftone imaging methods and apparatus that incorporate the respective advantages of the various classes of techniques discussed above.

A further object of the invention is to provide halftoning methods and apparatus enabling enhanced image rendition by printers and monitors having limited resolution—i.e., on the order of 512×512 pixels.

It is another object of the invention to provide such methods and apparatus that reduce or eliminate the visual artifacts introduced by conventional methods of dithered halftoning.

Another object of the invention is to provide apparatus and methods for high-speed, real-time halftone image generation.

It is a further object of the invention to provide apparatus and methods for high-speed generation of halftone images with readily available processing components.

Yet another object of the invention is to provide halftoning methods and apparatus that can be implemented in a parallel architecture with real-time processing and progressive image generation.

Other general and specific objects of the invention will in part be obvious and will in part appear hereinafter.

SUMMARY OF THE INVENTION

The foregoing objects are attained by the invention, which provides methods and apparatus for rapidly and accurately transforming a continuous tone image into a corresponding halftone image.

One aspect of the invention includes arranging a digital processor to calculate a halftone image by converting each pixel value of the continuous tone image into one of two extreme pixel values, each extreme pixel value corresponding to the lightest and darkest shade in the range of gray scale levels corresponding to the continuous tone image.

The processor then calculates an error matrix representative of the difference between each pixel value in the halftone image and its corresponding pixel value in the gray scale image, and modifies or "corrects" the halftone image by a pyramidal, multi-resolution error convergence process for successively larger sized blocks of pixels for a predetermined number of levels.

In accord with one aspect of the invention, each level of the pyramidal error convergence process includes three steps. More particularly, for each of a plurality of equal sized blocks of pixels in the halftone image, each block being centered around a preselected position, the processor first averages the corresponding values in the error matrix.

Subsequently, for each block, the processor recalculates what the average would be if the value of the preselected pixel position in the halftone image was the other extreme pixel value, and the corresponding error value in the error matrix was recalculated accordingly.

Thirdly, for each block, if the recalculated error average is less than the first calculated error average, the processor changes the value of the preselected pixel position in the halftone image to the other extreme pixel value.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF ILLUSTRATED EMBODIMENTS

System Structure

Figure 1:
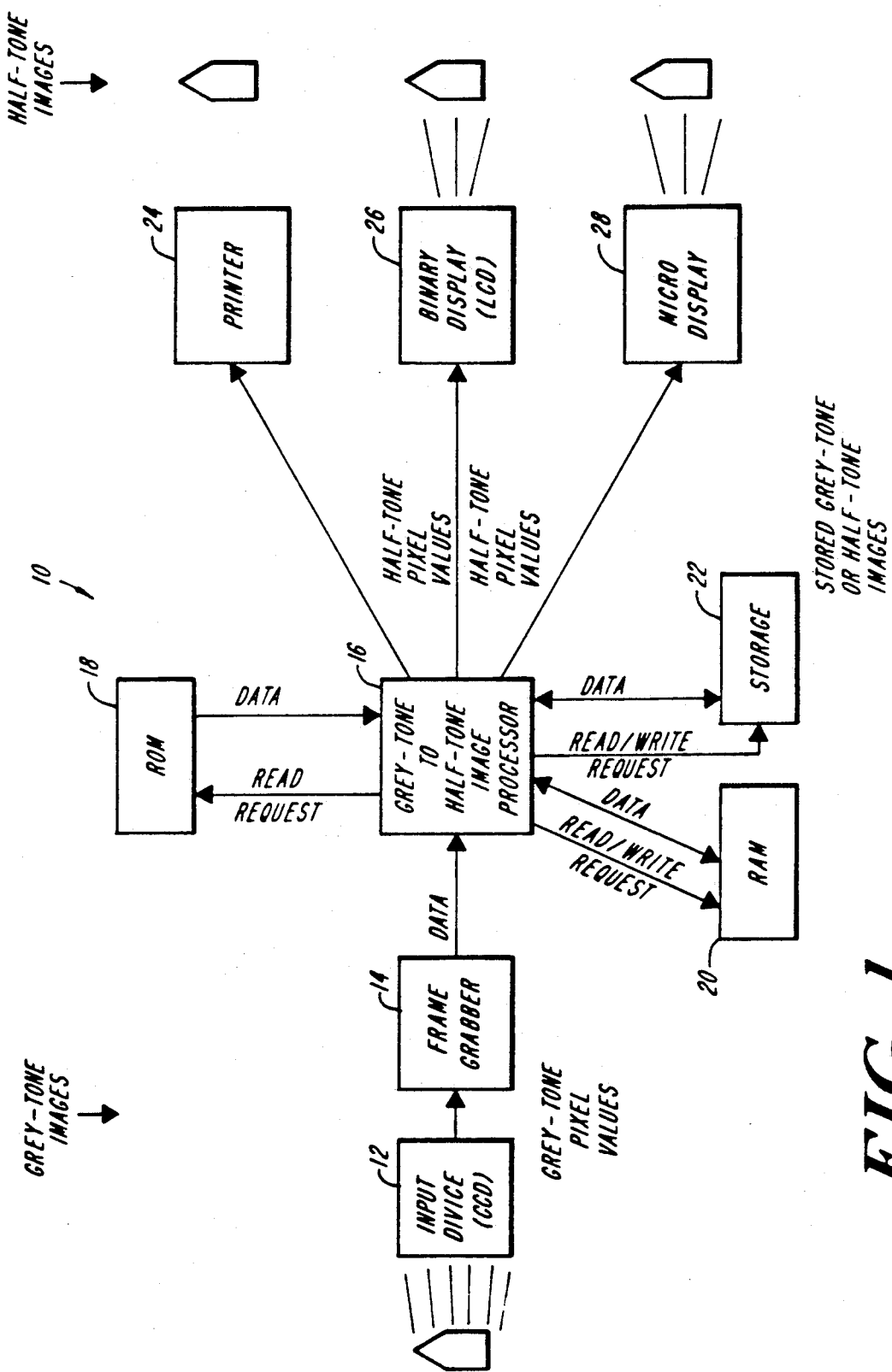
FIG. 1 is an electrical block diagram of an image processing system constructed in accord with the invention.

FIG. 1 is a block diagram of an image processing system 10 constructed in accordance with the invention. The system converts multi-value grey tone images into half-tone images that can be displayed or printed by limited-resolution monochrome monitors or printers, without the visual artifacts associated with conventional halftone imaging systems.

More particularly, the system 10 utilizes an image processor 16 that receives input signals representative of grey tone images, and executes an image conversion process in accord with the invention (discussed below in connection with FIG. 4) to generate a halftone image having high spatial resolution. The image conversion is implemented by processor 16 under the control of instructions stored in read-only memory (ROM) 18 or an equivalent permanent information storage device. Data utilized in the conversion process or generated by the process can be stored in, and retrieved from, a random access memory (RAM) device 20.

In one embodiment of the invention, image processing module 16 contains a general-purpose microcomputer processor, such as the Intel Corporation 80386. Alternatively, image processing module 16 can include a processor constructed specifically for rapid execution of the image conversion process of the invention. This special-purpose embodiment of image processing module 16 can utilize a neural network or other highly-parallel multiprocessor architecture, as discussed in greater detail hereinafter.

As indicated in FIG. 1, the halftone output images generated by the processor 16 can be transmitted to a printer 24 or a conventional binary monitor 26 for printing or displaying the halftone image. Because the invention enables visually enhanced rendition of halftone images on low-cost, moderate-resolution monitors and printers, display 26 can be a conventional liquid crystal display (LCD) or plasma display device, and printer 24 can be a conventional laser printer or ink jet printer having a resolution of 300 dots per inch (dpi).

The original multi-value grey tone image can be generated by a conventional input device 12, which can include a vidicon camera, CCD array, or other conventional imaging element for collecting light from an object 11 to form an image of the object. In the illustrated embodiment, the output of imaging device 12 is transmitted to a conventional frame grabber 14, which relays image-representative digital signals to image processor 16 on a frame-by-frame basis. The output of the frame grabber 14 is a series of digital picture element (pixel) values representative of a grey-tone image.

Alternatively, the input image can be obtained from a storage module 22, which may include conventional magnetic disks, optical disks, or other elements for storing digital data representative of images. The stored images can include grey tone images generated by the input module 12, grey tone images generated remotely by other input devices and transferred to storage, or halftone images generated by the image processor 16. Those skilled in the art will recognize that because the input to processor 16 can include images stored in and transferred from a storage device, the invention can be practiced without input device 12 and frame grabber 14. Moreover, it will be appreciated that a modem or other conventional data transmission apparatus can be employed to relay grey tone image data to the image processor 16.

In the embodiment depicted in FIG. 1, the halftone images generated by processor 16 can also be transmitted to a micro-display device 28. One such micro-display is the Private Eye manufactured by Reflection Technology of Waltham, Mass. The Private Eye, referred to herein as a "virtual monitor," is worn over a user's eye. A temporally-modulated light beam or "spot" is rapidly scanned across the visual field of the eye, so that an image is formed on the retina of the eye. The modulation of the beam and the content of the image are controlled by information-representative input signals transmitted to the device. The virtual monitor thus utilizes the persistence characteristic of the human visual system to form an image that is visible only to the wearer. By utilizing a virtual monitor or other binary micro-display, the image processing aspects of the invention can be practiced in the image enhancement/magnification system depicted in FIG. 2.

Figure 2:
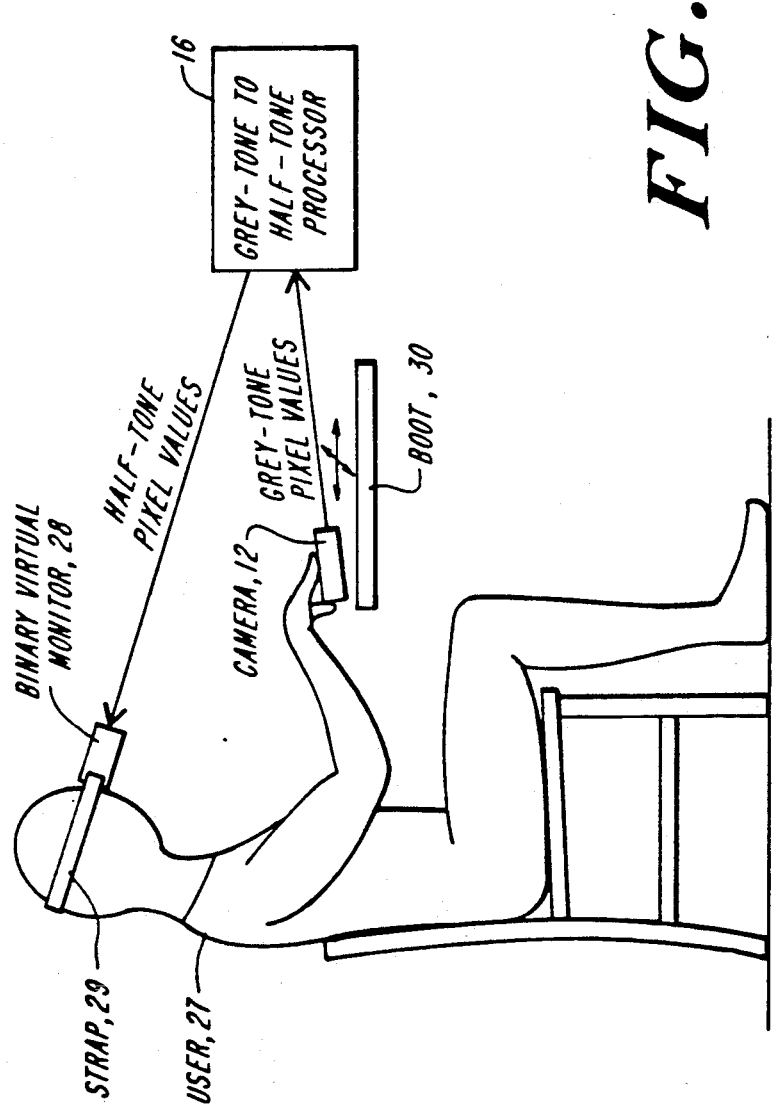
FIG. 2 is a schematic diagram depicting a visual aid embodiment of the invention.

Referring now to FIG. 2, the illustrated system 10 enables individuals with low vision deficiencies to read standard-font printed matter, by providing image magnification and contrast enhancement. The user 27 wears a virtual monitor or other miniature binary display 28 that is affixed to the user's head by a strap 29. The user can then move a conventional camera 12 across the print lines of a book or other written material 30. Camera 12 generates a grey-tone image, and transmits pixel values representative of the image to processor 16. The processor converts the grey tone image data into pixel values representative of a magnified halftone image of high spatial resolution, in accord with the method described hereinafter. The processor then relays the pixel values of the magnified halftone image to binary display 28, for viewing by the user.

This embodiment of the invention thus provides a compact, portable closed-circuit viewing system for vision impaired individuals, which affords a significantly larger visual field than that provided by conventional miniature, portable viewing systems. In particular, the visual field of the illustrated system utilizing a Private Eye display is approximately twice that afforded by a conventional system utilizing a Sony Watchman ® or other miniature television screen. The size of visual field provided by the Private Eye or other virtual monitor device can be further expanded by twenty to fifty percent through modification of the virtual monitor. A virtual monitor is also lighter and more compact than conventional miniature television screens.

Additionally, the head-mounted display system depicted in FIG. 2 enhances the user's ability to navigate across text and select text regions to be magnified. Low vision patients with substantially equal vision in both eyes, as well as patients having only one useful eye, can position the display so that the enlarged material appears in a region of the visual field corresponding naturally to the area being sought with the camera.

A further significant benefit provided by the illustrated embodiment is the extremely high contrast provided by a virtual monitor such as the Private Eye. This contrast level greatly exceeds that afforded by conventional miniature television screens.

System Operation—Overview

Figure 3:
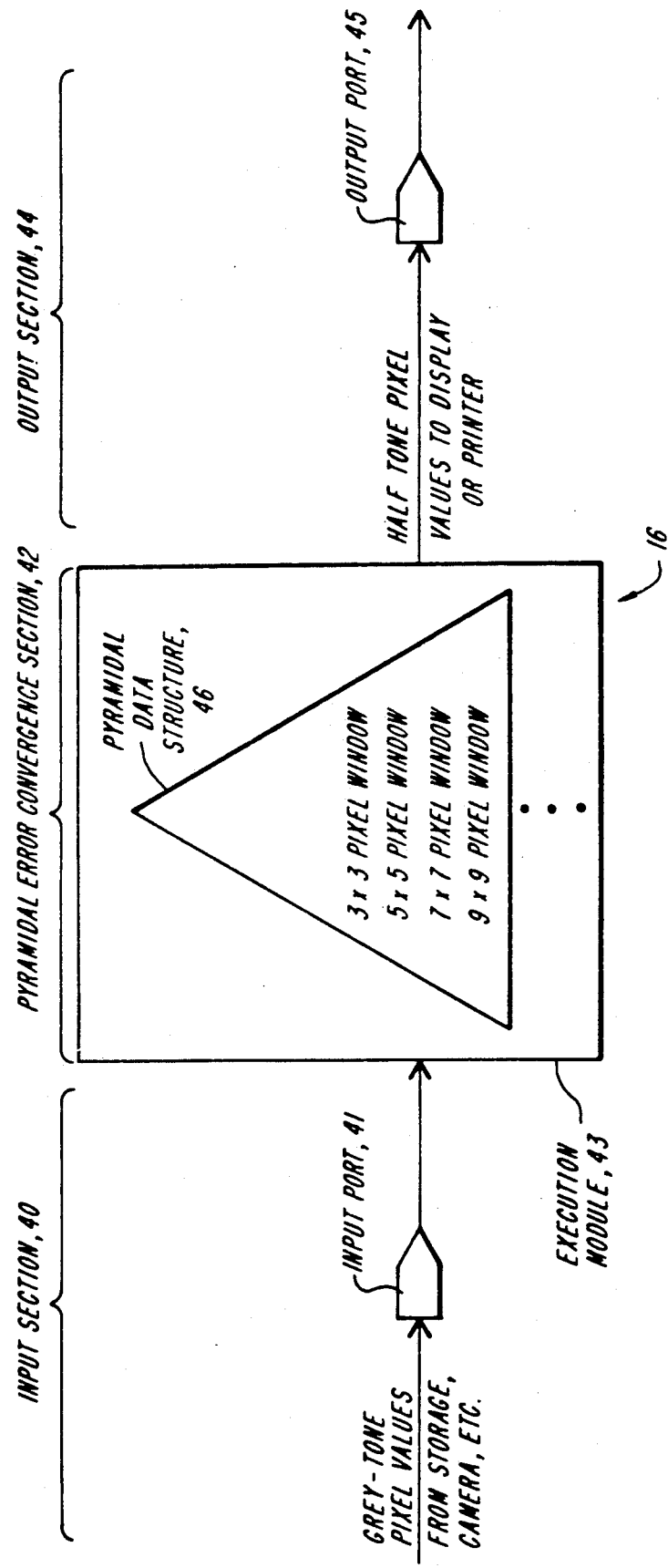
FIG. 3 is a schematic diagram showing the pyramidal image process executed by the image processing module of FIG. 1, and the pyramidal data structure generated by the image processing module.
Figure 4:
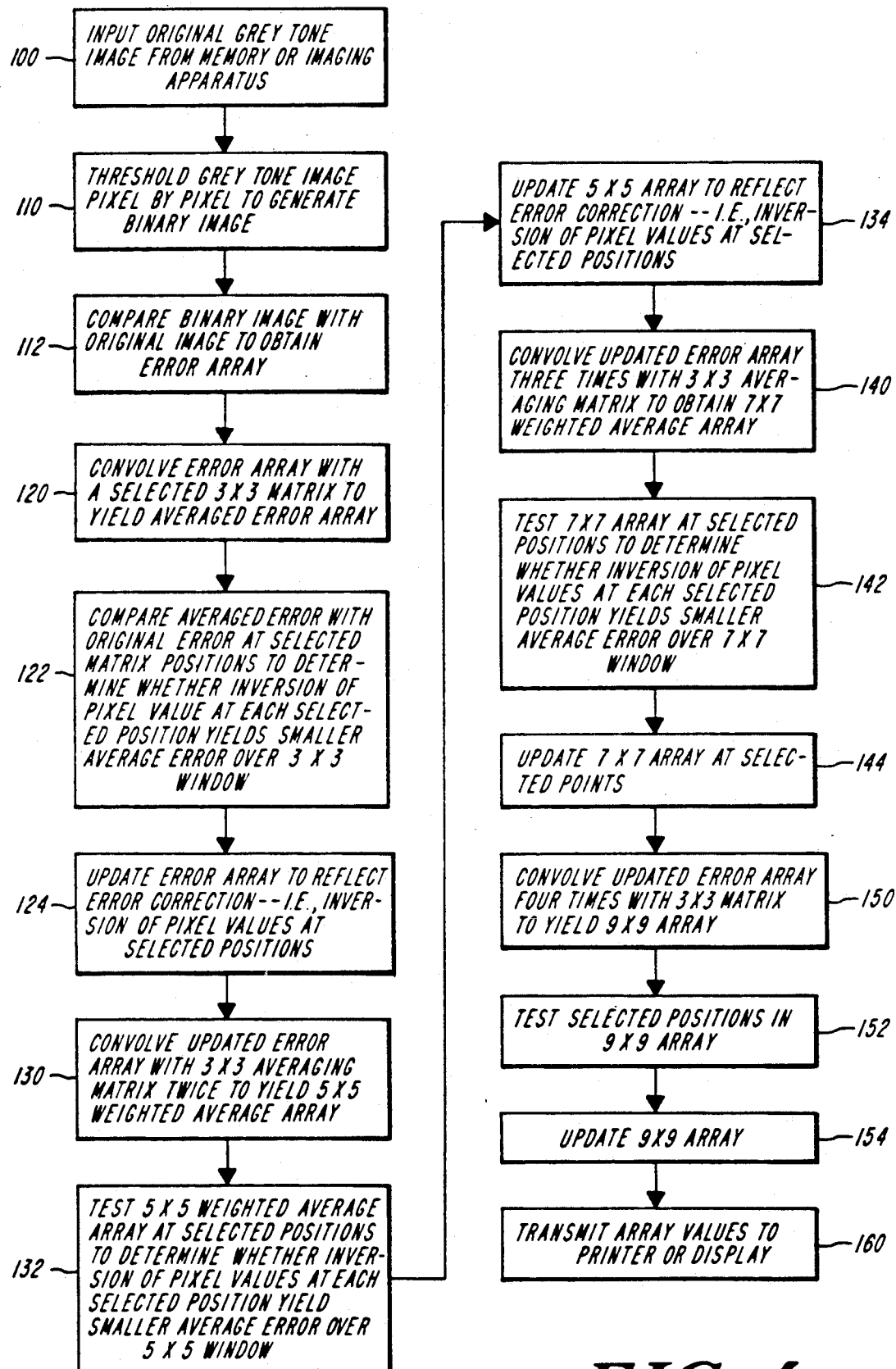
FIG. 4 is a flow chart depicting processing steps executed in accordance with the invention for converting a continuous grey tone input image into a high resolution halftone output image.

Having described image processing systems utilizing image processor 16, further discussion of the operation of image processor 16 is now in order, with reference to FIGS. 3 and 4. As depicted in FIG. 3, the image processor 16 incorporates an input section 40 having a conventional input port 41 for receiving grey tone pixel values from an imaging device or from storage; an execution module 43 having an error convergence section 42 that executes a pyramidal, multi-resolution error convergence process described hereinafter to convert the grey tone values to halftone values with high spatial resolution; and an output section 44 including an output port 45 for relaying the halftone pixel values to a conventional display or printer.

As indicated in FIG. 3, the execution module 43 generates a pyramidal data structure 46. The pyramidal structure incorporates successively larger data levels, each characterized by a selected region or "window" of image pixels (3×3, 5×5, 7 ×7, 9×9, etc.) that are processed in accordance with the method steps depicted in FIG. 4.

FIG. 4 shows a method for determining the binary assignment—for example, black or white—of each pixel of the output image, based on the grey-tone value of corresponding pixels of the input image. The method depicted in FIG. 4 is referred to herein as an error convergence method, because the binary value assignment for a given pixel is determined in response to error values associated with all neighboring pixels.

In particular, the error convergence method of FIG. 4 is a progressive coding scheme utilizing a pyramidal structure based on errors generated by the binary assignment at each pixel. At each successive level of the pyramid, larger regions of pixels are tested for a possible change of the binary assignment, in response to progressively larger regions of evaluation of local errors. As discussed below, the utilization of less than fifty percent overlapping pixel "neighborhoods" in the error convergence process enables parallel processing.

The results of the method of FIG. 4 are best explained with reference to FIGS. 5A-5D, which depict images corresponding to the progressive development of a halftone image at the various levels of the pyramidal error convergence method of the invention. Referring to FIG. 4, in the first level of the pyramid, the execution module 43 (FIG. 3) thresholds the original grey tone image I(i,j) on a pixel by pixel basis (step 110) to generate a binary image B(i,j). In one embodiment, the thresholding is defined as follows:

$$B(i,j) = \begin{cases} 255 \text{ if } I(i,j) > 127 \\ 0 \text{ if } I(i,j) \leq 127 \end{cases} \quad \text{Eq. (1)}$$

Figure 5A:
FIGS. 5A–5E depict intermediate and final halftone images generated from a continuous grey tone input image in accordance with the method of FIG. 4.

FIG. 5A shows the binary image resulting from this thresholding at the first level of the pyramid. The thresholded image is characterized by low spatial resolution.

The execution module 43 (FIG. 3) then compares the binary image with the original image (step 112) to obtain an error array E(i,j), except for E=0, where E(i,j) is the difference between the pixel values of the original input grey tone image and the binary image, as expressed in Equation 2:

$$E(i,j) = B(i,j) - I(i,j) \quad \text{Eq. (2)}$$

The sign of the error E(i,j) is thus representative of the pixel values in the binary image B(i,j), except in the case of E(i,j)=0, which is ambiguous.

In the second level of the pyramid, the execution module 43 (FIG. 3) addresses windows of 3×3 pixels. The signed error array, E(i,j), is convolved (step 120) with a 3×3 matrix, $x^{(3)}$, to yield a weighted average error of order 3, $E^{(3)}(i,j)$, as follows:

$$\bar{E}^{(3)}(i,j) = E(i,j) * x^{(3)} \quad \text{Eq. (3A)}$$

where * is the convolution operator and $$x^{(3)} = \begin{matrix} \frac{1}{12} & \frac{1}{12} & \frac{1}{12} \\ \frac{1}{12} & \frac{1}{3} & \frac{1}{12} \\ \frac{1}{12} & \frac{1}{12} & \frac{1}{12} \end{matrix} \quad \text{Eq. (3B)}$$

The sum of the weight of the terms in $x^{(3)}$ is equal to unity. The weight of the terms can be selected from various alternatives, each providing different weight distributions between central and surrounding points.

The execution module next compares the averaged error with the original error at selected pixel positions (step 122) to determine whether a change of the binary assignment of each test pixel (from black to white, or white to black) will result in a smaller average error over the 3×3 window. If a change to a tested pixel would result in a smaller average error, the pixel value is changed, or inverted. If change would result in a larger average error, the pixel value is not inverted.

Figures 6, 7:
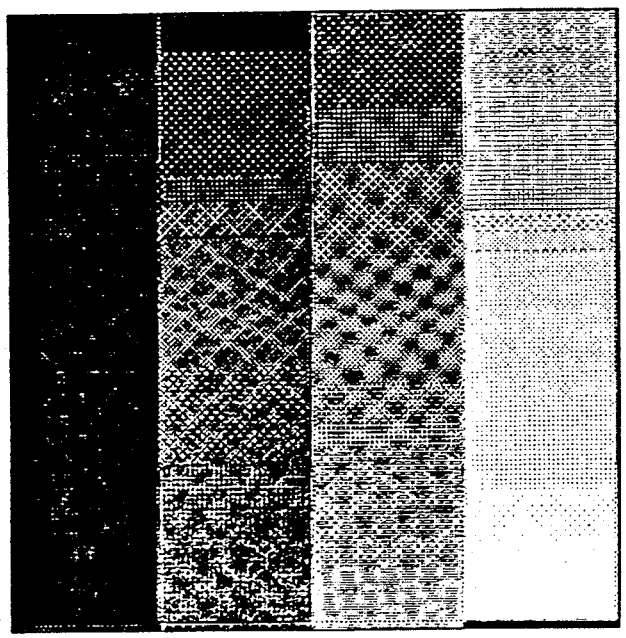
FIG. 6 is a schematic diagram depicting pixel positions tested for possible change of binary assignment in accord with the method of FIG. 4.
FIG. 7 depicts the results of halftoning a linear grey tone wedge in accordance with the method of FIG. 4.

Not every pixel will be tested. Instead, certain pixels are selected for testing, as indicated in FIG. 6, which depicts the pixel positions tested at each level of the process pyramid. At the 3×3 level of the process pyramid, the execution module tests every other pixel on every other line, as indicated by the positions marked by the numeral "3" in FIG. 6.

The test pixel positions indicated in FIG. 6 represent alternating diagonal horizontal-vertical patterns of selected pixels. These patterns have been found to provide good output image quality. Because the test pixel positions form diagonal arrays, for input images having uniform grey levels requiring a change of only the test pixels from their background, the pattern will have a visually more acceptable diagonal screen pattern.

This test pixel selection scheme avoids overlapping of the windows from which the errors are calculated with any other point that may have been changed at a given level of the pyramid. This independence permits completely parallel operation, because a pixel being changed will not affect the averaged error in any other neighboring point being considered in the image. The illustrated selection of pixels thus enables the use of high-speed, parallel computing architectures for halftone image generation.

Figure 5B:

At this level in the image conversion process, following calculation and correction of errors over windows of 3×3 pixels, the corresponding image resembles that depicted in FIG. 5B. Next, the error array is updated (step 124) for every change of a pixel (from black to white, or white to black) according to the following expression:

$$E(i,j) = \begin{cases} E - 255 \text{ if white} \rightarrow \text{black} \\ E + 255 \text{ if black} \rightarrow \text{white} \end{cases} \quad \text{Eq. (4)}$$

Thus, the original error array is modified wherever a decision is made to change the polarity of a pixel. The execution module then utilizes this modified error array to calculate the next level of the pyramid, in which 5×5 windows are utilized.

The 5×5 level of the pyramid is processed in a manner similar to that utilized in calculating the 3×3 level, by obtaining, for every point in the array, a weighted average error over a 5×5 mask. This is expressed by the following equation:

$$\bar{E}^{(5)}(i,j) = E(i,j) * x^{(5)} \quad \text{Eq. (5)}$$

The actual calculation of the average is performed by twice convolving (step 130) the updated error array E(i,j) with a uniform 3×3 averaging matrix $x'^{(3)}$—a matrix in which all terms equal 1/9. This is summarized by Equation 6:

$$\bar{E}^{(5)}(i,j) = E(i,j) * x'^{(3)} * x'^{(3)} \quad \text{Eq. (6)}$$

The result of these two convolutions is equivalent to one convolution with a 5×5 matrix $x^{(5)}$, as follows:

$$x'^{(5)} = \begin{matrix} \frac{1}{81} & \frac{2}{81} & \frac{3}{81} & \frac{2}{81} & \frac{1}{81} \\ \frac{2}{81} & \frac{4}{81} & \frac{6}{81} & \frac{4}{81} & \frac{2}{81} \\ \frac{3}{81} & \frac{6}{81} & \frac{1}{9} & \frac{6}{81} & \frac{3}{81} \\ \frac{2}{81} & \frac{4}{81} & \frac{6}{81} & \frac{4}{81} & \frac{2}{81} \\ \frac{1}{81} & \frac{2}{81} & \frac{3}{81} & \frac{2}{81} & \frac{1}{81} \end{matrix} \quad \text{Eq. (7)}$$

Those skilled in the art will appreciate that the use of repeated convolution enables implementation of the entire method with conventional hardware devices capable of only 3×3 convolutions.

Following the convolution step, certain pixels are selected for testing at the 5×5 level, in a manner similar to the testing performed at the 3×3 level. The positions of the 5×5 test pixels are indicated by the numeral 5 in FIG. 6. At the 5×5 level, the constraint of obtaining a uniform diagonal, non-overlapping distribution of pixels conflicts with the preferred practice of sampling lines that have not been sampled at the 3×3 level. Thus, FIG. 6 illustrates a compromise for the 5×5 level, utilizing an anisotropic sampling pattern. This selection results in a limited number of window overlaps that have very small numeric weights. The resulting small errors will not propagate further because they will be tested and corrected in the 7×7 window level.

The selected pixels are tested (step 126) to determine whether a change in the binary assignment of the pixel (from white to black or black to white) will result in a decrease in the averaged error over the 5×5 window. If a change in a tested pixel would result in a smaller averaged error, the binary assignment of the tested pixel is changed, or inverted. If a changed would result in a larger averaged error, the tested pixel is left unchanged.

Figure 5C:

The result of this error testing and correction at the 5×5 window level is depicted in FIG. 5C, which shows an intermediate image corresponding to the 5×5 level.

Upon completion of the 5×5 level, the 7×7 window level of the pyramid commences with a calculation (step 128) of the 7×7 weighted average, $\overline{E}^{(7)}_{(i,j)}$ for each pixel from the modified error array that was calculated at the 5×5 level. In one embodiment of the invention, the calculation of the 7×7 window is executed by three-fold successive convolution with a 3×3 uniform averaging window. This provides an averaging result equivalent to convolving the array with the 7×7 matrix $x^{(7)}$, as indicated by Equation 8:

$$\overline{E}^{(7)} = E(i,j) * x^{(7)} = E(i,j) * x'^{(3)} * x'^{(3)} * x'^{(3)} \quad \text{Eq. (8)}$$

Selected points are tested for change (step 130), and if a change in the binary assignment of a test pixel would result in a smaller averaged error over the 7×7 window, the pixel value is changed.

Figure 5D:

The positions of the test pixels for the 7×7 level are indicated in FIG. 6 by the numeral 7. As FIG. 6 indicates, the positions tested at the 7×7 level are arranged in a horizontal/vertical pattern that interleaves points tested at the 3×3 level diagonally, and points tested at the 5×5 level horizontally and vertically. The intermediate image corresponding to error testing and correction at the 7×7 window level is illustrated in FIG. 5D.

Following correction of errors at the 7×7 level, the execution module calculates values for the 9×9 window level. Operations performed at this level are similar to those utilized in the preceding levels. The corresponding matrix can be calculated in an analogous manner by convolving the $x^{(3)}$ uniform matrix with itself four times (step 130). Selected pixels are tested for change (step 132), and if changing the binary assignment of a given test pixel results in a smaller average error, then the pixel value is changed. The positions of the test pixels for the 9×9 level are indicated in FIG. 6.

Figure 5E:
Figure 5F:
FIG. 5F depicts a halftone output image generated by a conventional halftoning method, from an input image identical to that utilized for FIGS. 5A–5E.

The output image generated by error testing and correction at the 9×9 level is depicted in FIG. 5E. The resulting image quality compares favorably with the quality of an equivalent image processed by Bayer's (1973) dispersed dot dither method (FIG. 5F). Comparison of FIGS. 5E and 5F indicates a general similarity of textures, but demonstrates that image processing in accordance with the invention (FIG. 5E) provides superior spatial resolution in the output image, especially in the region of the feathers depicted in the image.

In the illustrated embodiment, image processing is terminated upon completion of the 9×9 level. Although the pyramidal structure generated by the invention can be extended to 11×11 pixel windows and beyond, tests indicate that the results are visually inconsequential, and requiring further processing time.

Those skilled in the art will appreciate that the process described above commences at the top of the pyramid depicted in FIG. 3 with maximum resolution—i.e., smallest window size. The process then progresses down the pyramid with progressively larger windows and lower resolution. Inherent in the process is the provision of additional gray levels in regions of the image where low frequency spatial image content requires additional grey levels. The invention is thus adaptive in nature, in the sense that it assigns more gray levels per presentation to areas of the image having low frequency spatial content, while restricting the number of gray levels representing areas of high spatial frequency content. This adaptive behavior is inherent in, and automatically provided by, the pyramidal error convergence method.

Averaged Error Threshold Determination

In accord with the invention, the binary value assigned to a pixel is changed only if such change would reduce the averaged error over the window (3×3, 5×5, 7×7, or 99 associated with the current level of the process pyramid. Changing the assignment of a point changes the sign of the error, E(i,j) at that point. Therefore, the execution module should make such a change only if $$\text{sign}(E(i,j)) = \text{sign}(\overline{E}^{(n)}(i,j)) \quad \text{Eq. (9)}$$

where n represents the pyramid level.

If the signs are not equal, a change in the assignment will cause an increase in the local averaged error. In the calculation of the averaged error threshold for each level of the pyramid, it is assumed that the weight assigned in the average error calculation is equivalent to the weight perceived by a human observer for the center point at that scale. For example, at the 5×5 level of the pyramid the center point is weighted as 1/9. (See Equation (7) above). A change in the binary assignment at the 5×5 level will thus cause a 255/9=28 change in the average error at that level. Thus, pixels with averaged errors larger than 28 will benefit from a change of the binary assignment.

Alternatively, if the system is configured to permit changes reducing the absolute value of the error, including cases in which such changes invert the sign of the averaged error, then pixels with averaged error larger then 14 can be changed.

Applying these criteria to the method discussed above, tests have been performed using linear grey tone wedges as input images, to evaluate the accuracy with which the binary output images represent the input grey levels. These tests have demonstrated that the above criteria result in an unequal representation of the grey levels of a linear grey tone wedge. In addition, the number of grey levels represented was less than expected. These effects result from arbitrary selection of weight for the $x^{(3)}$ matrix, and from non-ideal placing of the points tested at 5×5 level.

In order to improve the results of the process, error correction thresholds can be empirically determined for each level of the pyramid, by utilizing values that divide each previous section of the grey scale wedge into two nearly equal sub-sections. Table I compares empirically determined error thresholds with threshold values calculated in accordance with the above-listed criteria.

TABLE I

Error thresholds used to determine whether a pixel binary assignment should be changed:

| pyramid level | 3 × 3 | 5 × 5 | 7 × 7 | 9 × 9 |
|---|---|---|---|---|
| calculated values | 43–86 | 14–28 | 9–18 | 7–14 |
| empirical value | 64 | 36 | 10 | 3 |

FIG. 7 depicts a linear grey tone wedge halftoned with the empirically determined error threshold values shown in Table I. These error threshold values provide a more even distribution of values along the wedge, and enhance the number of distinguishable grey levels. In FIG. 7, 32 grey levels are discernable.

Clustered Dots and Position Dither

In addition to the basic method discussed above in connection with FIG. 4, other embodiments of the invention can incorporate clustered dot methods and position dithering, as described below. Clustered dots can be utilized to enhance printing reproducibility. Position dithering, in turn, can be employed for reducing contouring and anisotropy of the mixture, and to furnish desirable blue noise characteristics.

Clustered Dots: The selection of test pixels indicated in FIG. 6 results in dispersed dot patterns, as is evident from FIG. 5E and FIG. 7. Unfortunately, dispersed dot patterns frequently do not reproduce well in print media, because of unreliable reproduction and placement of single dots. Accordingly, clustered dot patterns have been developed to improve the quality of reproduction by laser printers and other moderate-resolution print devices. The pyramidal error convergence method of the invention is readily modified to accommodate clustered dot patterns, further enhancing print reproduction. The only modification required to implement this is a different selection of points to be tested at each level of the process pyramid, as indicated in FIG. 8.

Figures 8, 9:
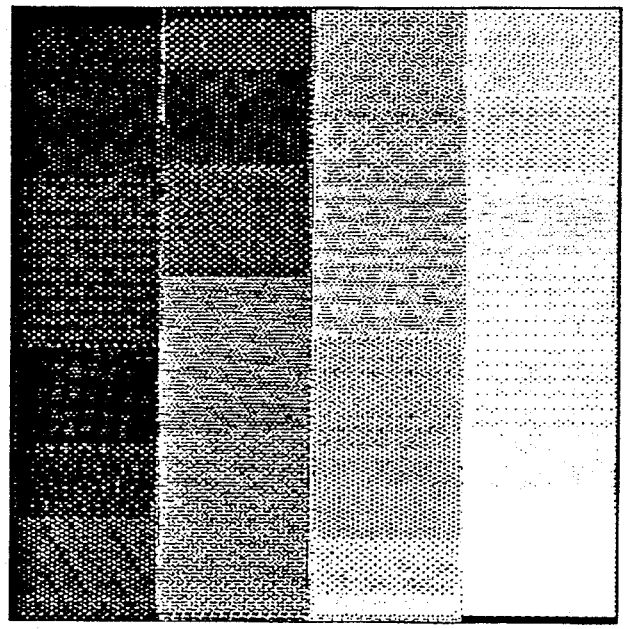
FIG. 8 is a schematic diagram depicting pixel positions tested for possible change of binary assignment in accordance with a clustered dot practice of the invention.
FIG. 9 depicts the results of halftoning a linear grey tone wedge in accordance with the clustered dots embodiment of the invention, utilizing the same error threshold values utilized in FIG. 7, but with the test positions indicated in FIG. 8.

FIG. 8 depicts pixel positions to be tested at each process level in a clustered dots embodiment of the invention. The shaded areas indicate the windows over which error values are calculated for the 3×3 level (to left) and 5×5 level (bottom). This pattern diverges from the pattern depicted in FIG. 6, beginning with the 5×5 level of the process pyramid. In particular, points at the 5×5 level and succeeding levels are situated adjacent to points already tested at earlier levels of the process pyramid. This adjacency provides clustered rather than dispersed dots, where possible. The resulting patterns represent a compromise between dispersed dot and clustered dot patterns, with greater clustering of the dots occurring toward intermediate levels of grey tones.

This effect is depicted in FIG. 9, which shows the results of halftone processing a linear grey tone wedge with the clustered dots pattern, using error thresholds of the same values as those utilized in connection with FIG. 7. The tested pixel positions are those indicated in FIG. 8.

Those skilled in the art will appreciate that ink spread characteristics and differences between the size of a printed dot and a non-printed dot may result in printed grey levels that are not linearly related to the number of black dots. This is discussed in Stevenson et al., "Binary Display of Hexagonally Sampled Continuous-Tone Images", *JOSA A*, Vol. 2, pp. 1009–1013, 1985. Thus, an optimal, accurate assignment of error thresholds may be printer-dependent and paper-dependent, and can be obtained only be extensive calibration. However, the empirical values noted in Table I provide a good first approximation from which such assignments can be determined.

Position Noise Dithering: The pyramidal error convergence methods described above combine high resolution with large dynamic range, and provide visually pleasing diagonal textures in the output halftone image. The dispersed dot embodiment of the invention provides diagonal textures similar to those generated by certain prior art methods, but with higher spatial resolution. See, for example, Bayer's dispersed dot dither technique. The enhanced spatial resolution provided by the invention is demonstrated by a comparison of FIG. 5E with FIG. 5F. The resolution advantage over conventional dither techniques, and the multiplicity of grey levels discernable in the halftone output—e.g., thirty-two grey levels—are significant benefits of the dispersed dot practice of the invention.

The halftone output of the image processor can be further enhanced, moreover, by eliminating visible false contour lines. These artifacts, which are similar to those evident in images processed by Bayer's dither method, are discernable because of the visibility of texture changes in areas of low grey level gradient, as in FIG. 5E.

Additional improvements in appearance can be attained by enhancing the texture within areas of uniform grey level. Research by Ulichney demonstrates that halftone patterns of uniform grey levels having "blue" noise characteristics and reduced anisotropy are much more acceptable and visually pleasing than are patterns lacking these characteristics.

One embodiment of the invention provides improved blue noise and isotropy characteristics, while simultaneously reducing false contouring, by introducing pseudo-random variations or "noise" in the selection of points tested at each level of the process pyramid. Instead of testing points in accord with the orderly grids depicted in FIG. 6 or FIG. 8, the execution module in this embodiment of the invention pseudo-randomly "shifts" the selection to one of the eight neighboring pixels, for approximately half the pixels in the image field. The decision as to which pixel will be tested and modified is established in accord with known random variable processes. This random selection need not be re-calculated for each image; it can be selected once and then fixed and used for every image.

In accord with this embodiment of the invention, horizontal and vertical shifts are determined independently. In one embodiment, the probability of shift of a tested central point to any of the neighboring positions is designated by a matrix P, where $$P = \begin{matrix} \frac{1}{60} & \frac{2}{15} & \frac{1}{60} \\ \frac{1}{15} & \frac{8}{15} & \frac{1}{15} \\ \frac{1}{60} & \frac{2}{15} & \frac{1}{60} \end{matrix} \qquad \text{Eq. (10)}$$

Figure 10:
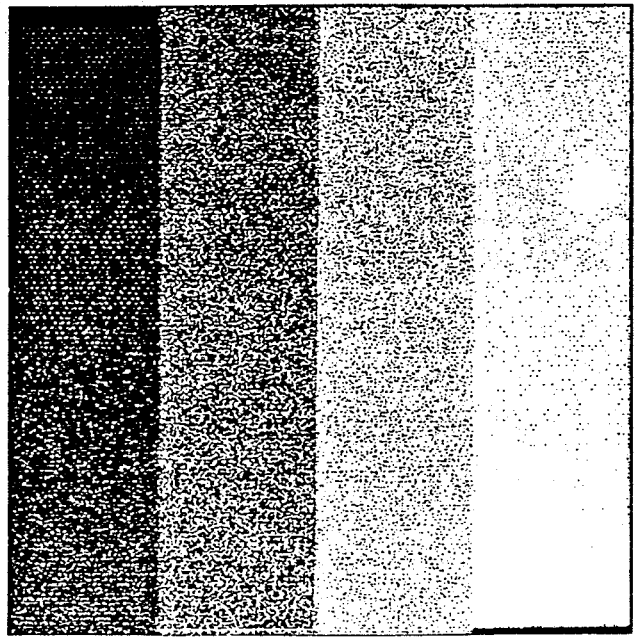
FIG. 10 depicts the results of halftoning a linear grey tone wedge in accord with another practice of the invention, utilizing the test pixel positions indicated in FIG. 8.

The results of this position noise dithering variation are exemplified by FIG. 10. In particular, FIG. 10 shows a linear grey tone wedge halftoned by the clustered dot position-dithered method, using the same test pixel selections as those employed in FIG. 9—i.e., the positions indicated in FIG. 8. Comparing FIG. 10 to FIG. 9, it will be seen that false contours are significantly reduced, and that only a few such contours are visible, at the very dark and very bright ends of the wedge.

Visual and Quantitative Comparison

The pyramidal error convergence methods described above have been utilized to process a wide range of grey tone images, and the halftone images generated thereby can be compared with the results of conventional halftoning techniques, by reference to FIGS. 11A-15D.

In particular, FIGS. 11A-15D relate to a comparison of halftone images generated by the pyramidal error convergence method of the invention, and halftone images generated by two different conventional methods. Identical input images were processed by all three methods. The input images were 512×512 grey tone images having 256 grey levels, and were selected from a widely used package of images distributed by the University of Southern California. (See Weber, *USC SIPI Report 101*, Image Data Base Signal and Image Processing Institute, University of Southern California, Los Angeles, Calif., 1988). The input images were halftoned at a spatial resolution of 1 dot per pixel, and the output images were printed at a density of 150 dots per inch, to enable clear imaging of dot patterns. The two conventional halftone methods tested for comparison with the invention were the ordered dither, dispersed dots method discussed in Bayer, "Optimum Method for Two Level Rendition of Continuous-Tone Pictures," 1973; and the modified error propagation technique addressed in Ulichney, "Digital Halftoning," 1987.

Figure 11A:
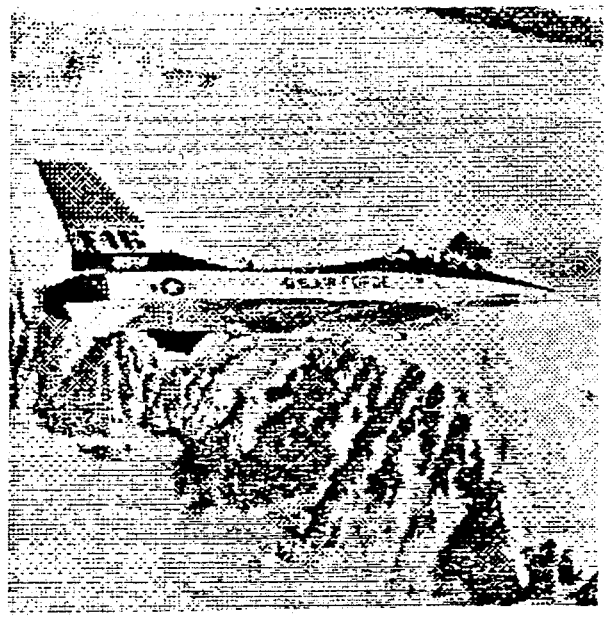
FIGS. 11A and 11B depict moderate resolution (512×512) images generated by two different conventional halftoning methods.
Figure 11B:
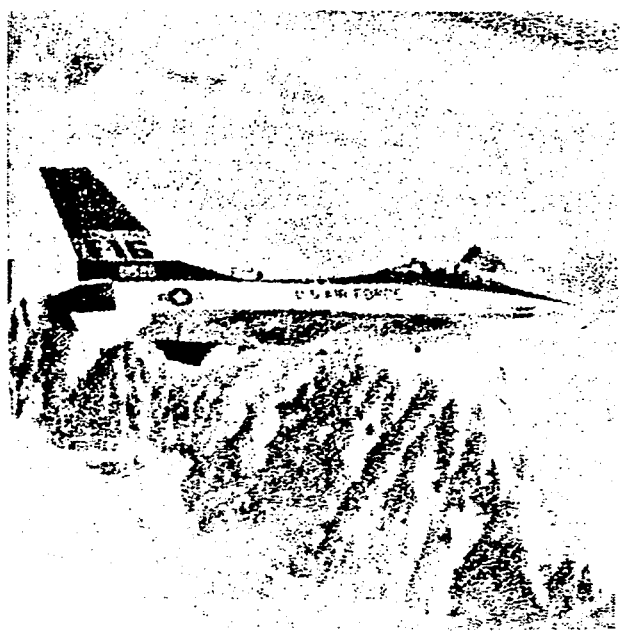
Figure 11C:
FIG. 11C depicts the image shown in FIGS. 11A and 11B, processed by the pyramidal error convergence method of the invention.

FIGS. 11A, 11B, and 11C present three renditions of a moderate resolution (512×512 dots) image of an F-16 aircraft, generated by two conventional halftoning techniques and by a method in accord with the invention. Spatial resolution in each image can be compared by noting the serial number under the F-16 tail marking. FIG. 11A, in particular, presents an image processed by a conventional dispersed dot method with 33 grey levels. See Bayer, supra. Spatial resolution is acceptable, but textures are very visible and false contouring is evident. FIG. 11B depicts the same image processed by a conventional error propagation method with blue noise dithering. The dithering reduces false contours while maintaining spatial resolution. Implementation of this method, however, is inherently slow. FIG. 11C presents the same image processed by a pyramidal error convergence method in accord with the invention. As FIG. 11C demonstrates, the invention provides higher spatial resolution with smooth transitions in regions of shallow gradients. Although the textures are slightly less pleasing then the textures obtained with the error propagation method, the invention provides superior spatial resolution and enables faster implementation.

Figure 12A:
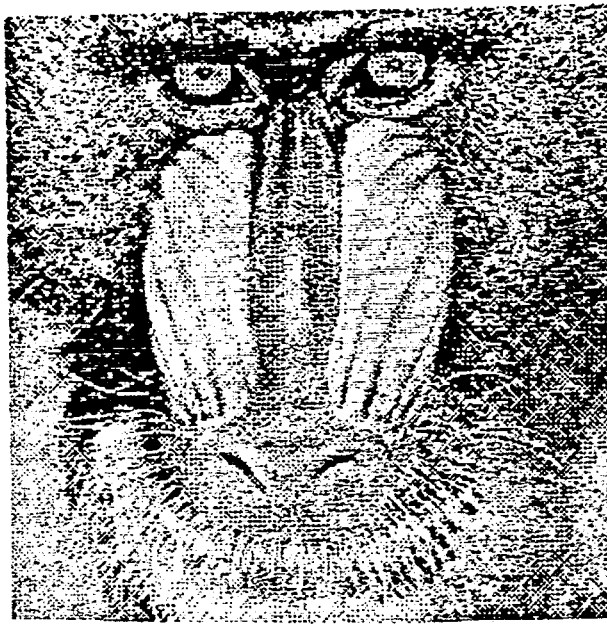
FIGS. 12A and 12B depict another moderate resolution (512×512) image processed by two different conventional halftoning methods.
Figure 12B:
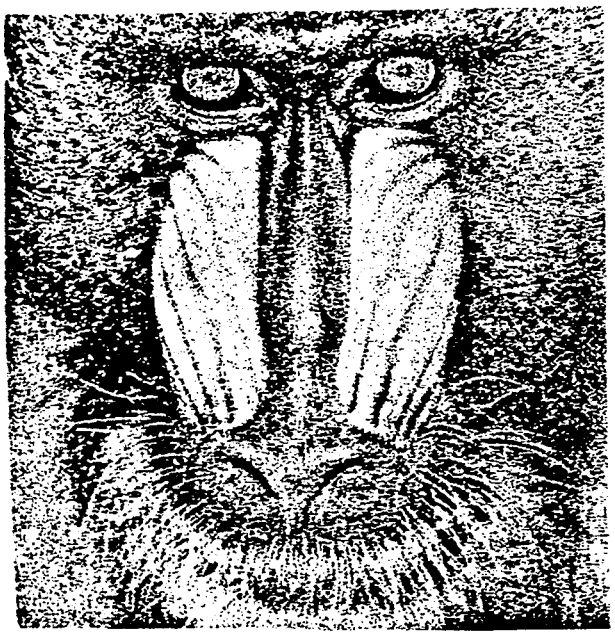
Figure 12C:
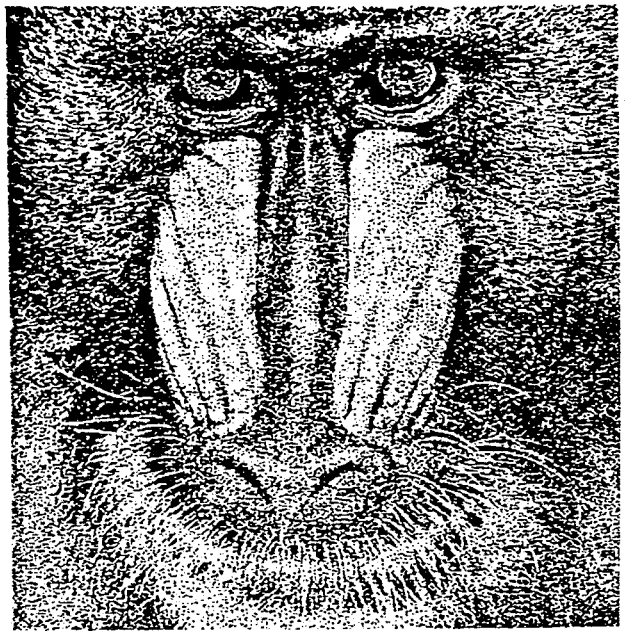
FIG. 12C depicts the image shown in FIGS. 12A and 12B, processed by the pyramidal error convergence method of the invention.

FIGS. 12A, 12B, and 12C are three renditions of a baboon face, processed by the same methods (and presented in the same relative sequence) utilized for FIGS. 11A, 11B, and 11C. These images illustrate the advantages of the pyramidal error convergence method of the invention over the two conventional halftoning techniques, in both spatial resolution and texture.

Figure 13A:
FIGS. 13A and 13B depict another image processed by two different conventional halftoning methods.
Figure 13B:
Figure 13C:
FIG. 13C depicts the image shown in FIGS. 13A and 13B, processed by the pyramidal error convergence method of the invention.

FIGS. 13A, 13B, and 13C show three images of a human face. Here, the textures used to render the skin are critical. In FIG. 13A, a simulated optical-screen clustered dots dither was utilized because this method provides smooth skin texture; however, the spatial resolution provided by this conventional method is poor. (Compare, for example, the dispersed dots result for the same image, as illustrated in FIG. 5E.) In FIG. 13B, the same image is halftoned by a conventional error propagation method. In contrast, FIG. 13C, which is generated by the pyramidal error convergence method of the invention, exhibits good skin texture and high spatial resolution.

As can be seen in FIGS. 11A-13C, the pyramidal error convergence method of the invention provides spatial resolution superior to both other methods, with a similar number of grey levels. The random nature of the dithered pattern of the invention substantially blends and reduces previously visible false contours. This can be demonstrated by comparing FIG. 5E with FIG. 13C. The pyramidal error convergence/dither method of the invention thus also provides smooth texture transitions comparable with the results of the error propagation method. Moreover, while images processed with the error propagation method demonstrate good spatial resolution and blue noise texture, rapid implementation of this method is limited by its inherent serial nature.

In a further comparison of the dither variation method of the invention with conventional halftoning methods, radial average frequency spectrum and anisotropy were evaluated to determine the effect of position noise dithering on the spatial spectral properties of the textures of uniform grey level images. The results of these measurements are depicted in FIGS. 14A-15D.

Figure 14A:
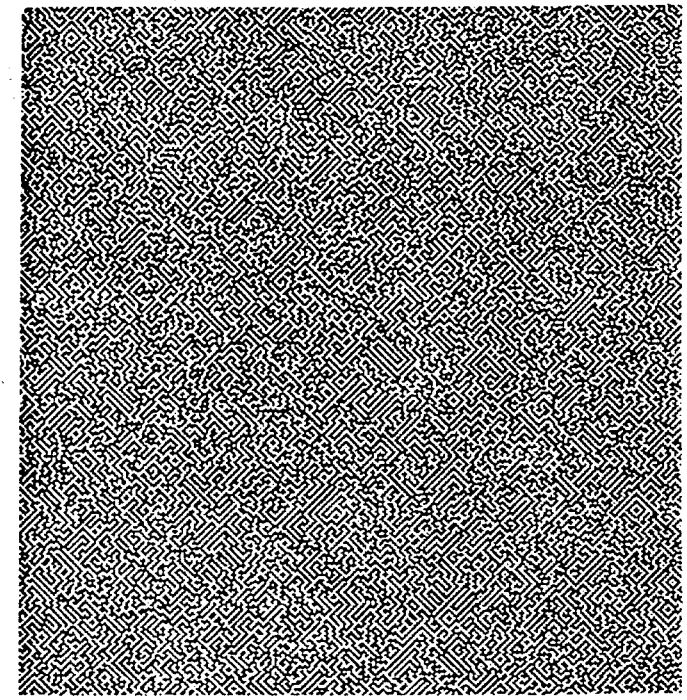
FIG. 14A depicts a sample image of uniform grey level, halftoned by the conventional error propagation method.
Figure 14B:
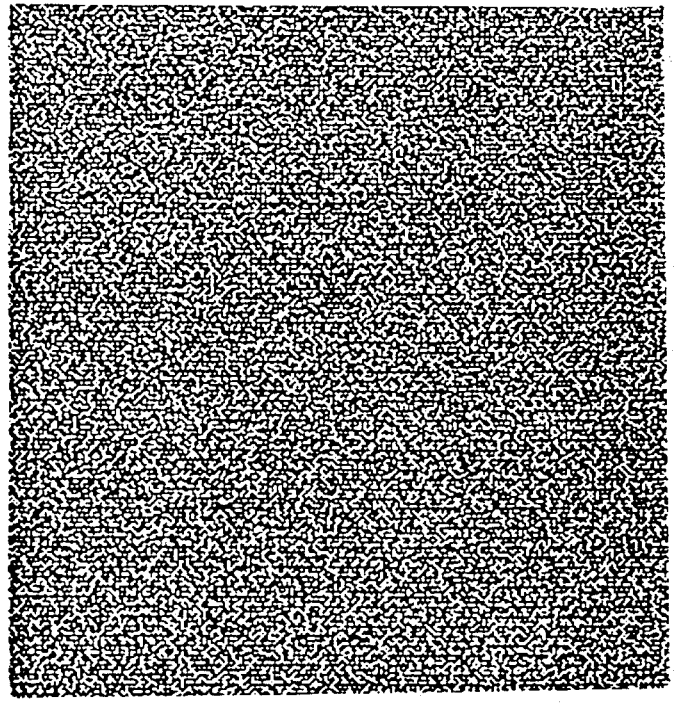
FIG. 14B depicts a sample image like that shown in FIG. 14A, halftoned in accordance with the invention.
Figure 14C:
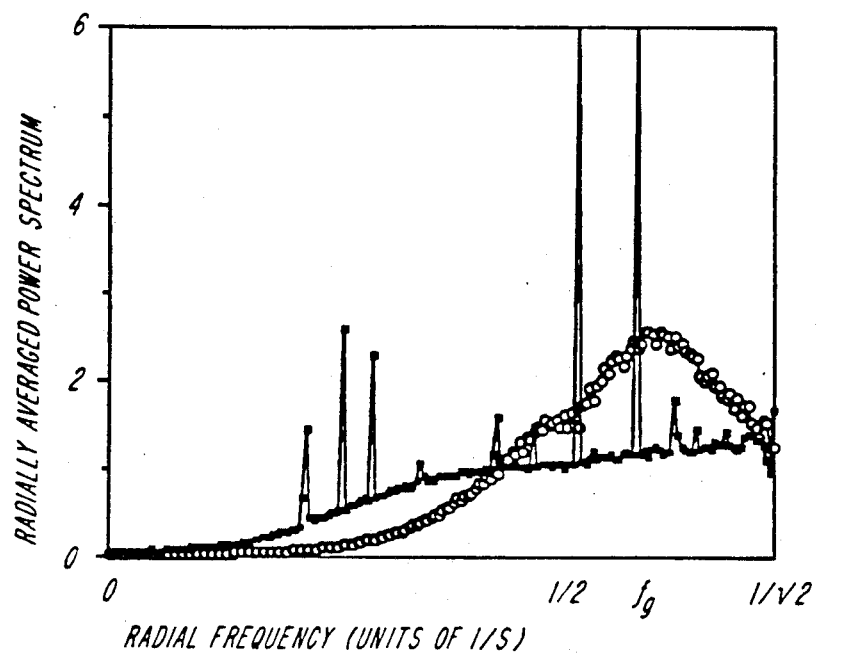
FIG. 14C is a graph indicating radial spectra obtained from 10 samples each of the images illustrated in FIGS. 14A and 14B, using the conventional error propagation method, and the randomized pyramidal method of the invention, respectively.
Figure 14D:
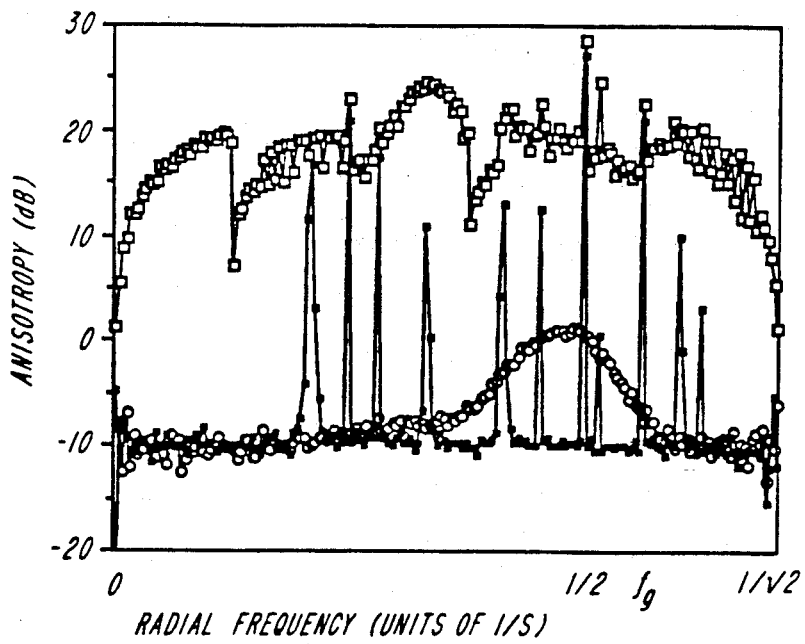
FIG. 14D is a graph comparing anisotropy for the pyramidal error convergence method of the invention (randomized and nonrandomized), and the conventional error propagation method, respectively.

FIG. 14A depicts a sample image of uniform grey level, halftoned by the conventional error propagation method. FIG. 14B depicts a sample image like that shown in FIG. 14A, halftoned in accordance with the invention. FIG. 14C is a graph indicating radial spectra obtained from 10 samples each of the images illustrated in FIGS. 14A and 14B, using the conventional error propagation method, and the randomized pyramidal method of the invention, respectively. FIG. 14D is a graph comparing anisotropy for the pyramidal error convergence method of the invention (randomized and nonrandomized), and the conventional error propagation method, respectively.

Figure 15A:
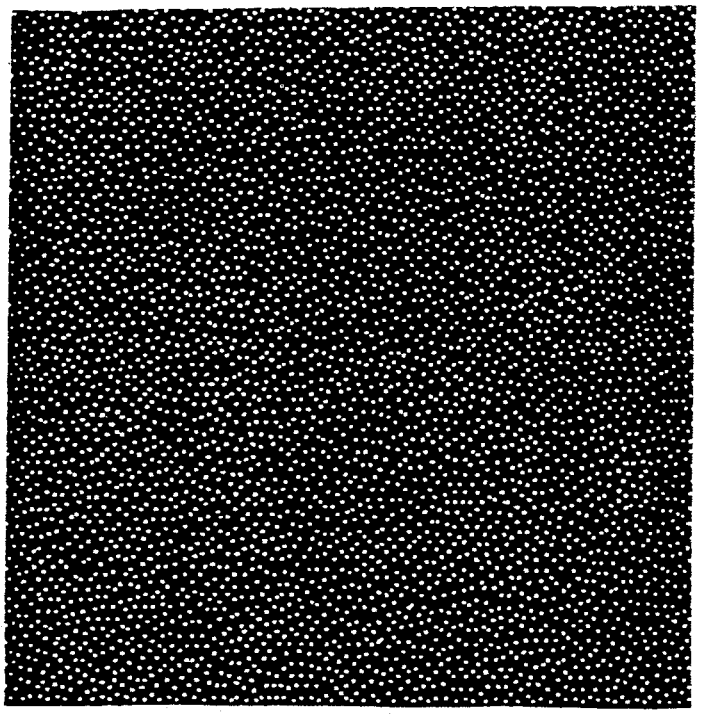
FIG. 15A depicts a sample image of another uniform grey level, halftoned by the conventional error propagation method.
Figure 15B:
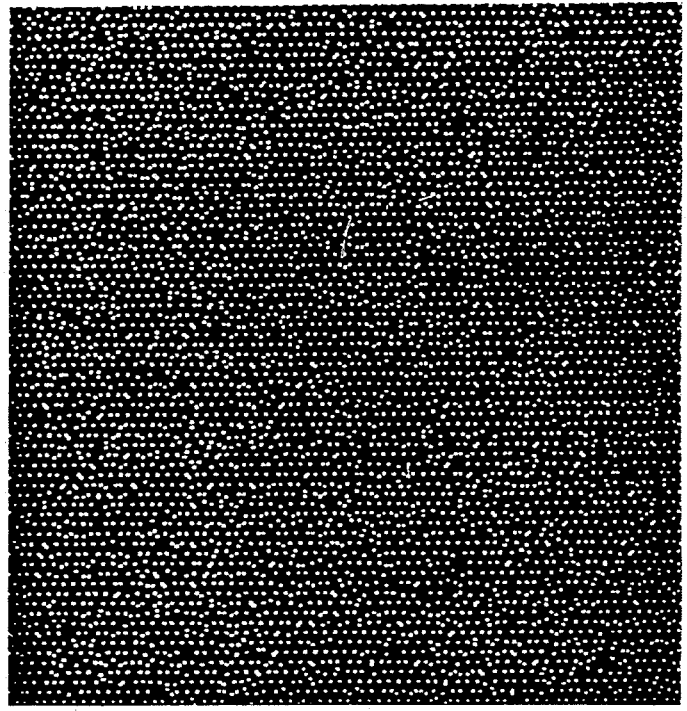
FIG. 15B depicts a sample image like that depicted in FIG. 15A, halftoned in accordance with the invention.
Figure 15C:
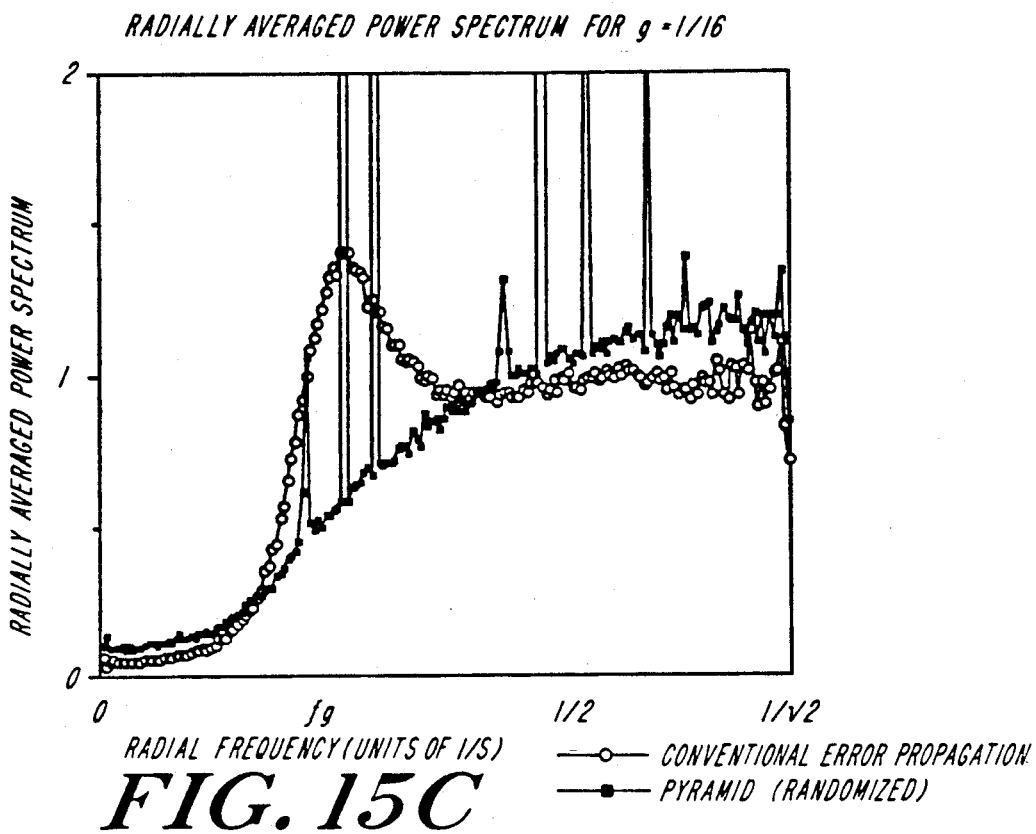
FIG. 15C is a graph indicating radial spectra obtained from 10 samples each of the images illustrated in FIGS. 15A and 15B, using the conventional error propagation method, and the randomized pyramidal method of the invention, respectively.
Figure 15D:
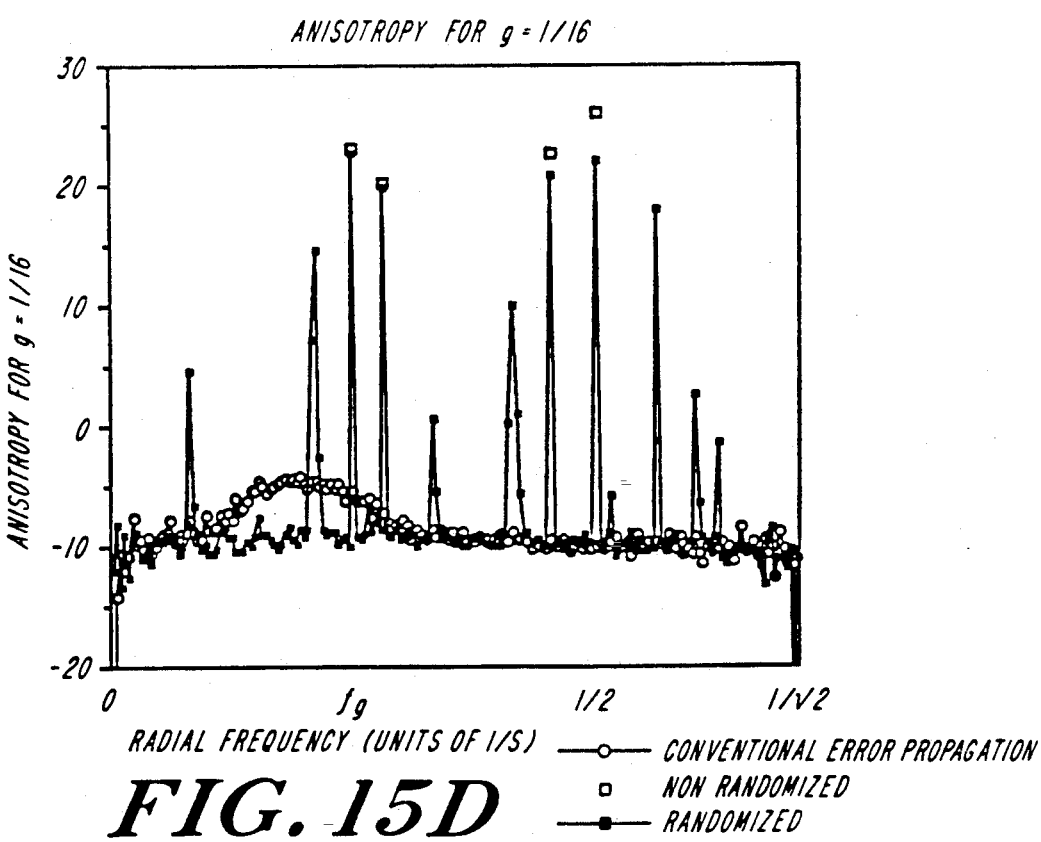
FIG. 15D is a graph comparing anisotropy for the pyramidal error convergence method of the invention (randomized and nonrandomized), and the conventional error propagation method, respectively.

FIG. 15A depicts a sample image of another uniform grey level, halftoned by the conventional error propagation method. FIG. 15B depicts a sample image like that depicted in FIG. 15A, halftoned in accordance with the invention. FIG. 15C is a graph indicating radial spectra obtained from 10 samples each of the images illustrated in FIGS. 15A and 15B, using the conventional error propagation method, and the randomized pyramidal method of the invention, respectively. FIG. 15D is a graph comparing anisotropy for the pyramidal error convergence method of the invention (randomized and nonrandomized), and the conventional error propagation method, respectively.

FIGS. 14A, 14B, 14C and 14D, in particular, demonstrate certain characteristics of sample images of uniform grey level 85 (g=⅓). The sample image in FIG. 14A was generated by a conventional error propagation method, utilizing selected weight values in accord with the method recommended for a rectangular grid by Ulichney. The sample image in FIG. 14B, conversely, was generated by a pyramidal error convergence method in accord with the invention, utilizing random position dithering. Very little directional texture can be discerned. Thus, comparison of FIGS. 14A and 14B demonstrate that the pyramidal error convergence method provides better performance than the conventional error propagation method.

As noted above, FIG. 14C depicts radial spectra obtained from 10 samples each of the images illustrated in FIGS. 14A and 14B, generated by conventional error propagation and by the pyramidal error convergence method of the invention, respectively. The spectra corresponding to the pyramidal method contain strong peaks at a few frequencies, but both spectra have the preferred characteristics of low frequency cut-off at the principal frequency ($F_g$), sharp transitions, and relatively flat blue noise area.

FIG. 14D shows the anisotropy calculated for the pyramidal error convergence method (for both randomized and non-randomized variations) compared with the anisotropy of the error propagation sample. The ideal result would be flat anisotropy of −10dB. The randomized pyramidal method attains this level, except for a few spikes. In the error propagation method, however, anisotropy increases at the principal frequency to the 0dB. The non-random version of the pyramidal error convergence method is presented to illustrate the effect of randomization in reducing the anisotropy by 25dB or more across most frequencies.

FIGS. 15A, 15B, 15C and 15D are similar to FIGS. 14A, 14B, 14C and 14D, respectively, except that the image is characterized by grey level 16 (g=1/16). As FIGS. 14C and 14D indicate, the error propagation method of the invention provides better anisotropy results. In this case, the spectral characteristics are very similar and close to the ideal for both methods.

As FIGS. 14C, 14D, 15C, and 15D illustrate, the spectra corresponding to the dithered patterns of the invention contain spikes at frequencies corresponding to the underlying ordered pixel selection patterns. However, the general characteristics of the dithered pattern spectra are similar to the ideal patterns discussed in Ulichney, "Digital Halftoning," 1987. The spectra associated with the invention have a nearly-ideal blue noise high-pass nature, with a transition occurring near the principal frequency. The anisotropy (FIGS. 14D and 15D) is at the ideal −10 dB level, except for a few peaks at the underlying frequencies. These peaks result from the pixel selection patterns discussed above, which are intended to have the more preferable diagonal orientations. The anisotropy represented by the peaks is not immediately discernable to human observers.

Implementation With Parallel Architectures

Based on the pixel selection criteria discussed above, multi-resolution pyramidal error convergence methods in accord with the invention can be implemented in a multiprocessor computing system or other parallel processing computer architecture. Preferably, the processing element or elements should be capable of simultaneously executing 3×3 convolution operations for a complete 512×512 pixel image. Such processing devices are now available, and tests have demonstrated that relatively inexpensive hardware embodiments of the invention can perform the convolution operation in approximately 0.03 seconds. As discussed above, the invention utilizes iterative application of the 3×3 convolution step: once for the 3×3 level, twice for the 5×5 level, three times for the 7×7 level, and four times for the 9×9 level, for a total of ten iterations of the 3 ×3 convolution operation. These iterations determine the time required for calculating a 512×512 pixel image. Images larger than 512×512 can be divided into smaller overlapping segments that are processed and recombined in a known manner after removal of the overlapped edges. Those skilled in the art will appreciate that the overlapping areas are used in removing edge artifacts from each section. A significant advantage of the invention is that the randomization associated with position noise dithering, as described above, provides an invisible seam between segments.

It will thus be seen that the invention efficiently attains the objects set forth above, among those made apparent from the preceding description. In particular, the invention provides a multi-resolution error convergence method that attains significant advantages over conventional halftone methods. It provides superior spatial resolution and an enhanced dynamic range. The blue noise characteristics of the textures generated by the invention are comparable with those of the best implementation of the relatively slow error propagation technique.

In addition, the technique is adaptive in nature and provides for the rendition of more gray levels where the local spatial frequencies are low. These advantages are especially significant for the rendition of images at moderate resolution of 512×512 dots or less.

Apparatus and methods in accordance with the invention are especially suitable for applications in computer preparation of images for printing, in preparation of images for miniaturized displays, and in high-speed limited-bandwidth communication such as picture phones and facsimile machines. The speed of the illustrated system is enhanced by its progressive coding property and its adaptability to rapid parallel processing with currently available hardware.

It will be understood that changes may be made in the above construction and in the foregoing sequences of operation without departing from the scope of the invention. For example, the invention can be practiced with test pixel selections other than those indicated in FIGS. 6 and 8. It is accordingly intended that all matter contained in the above description or shown in the accompanying drawings by interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Apparatus for transforming a multiple gray scale image into a halftone image, the multiple gray scale image having a range of gray scale levels including a lightest shade and a darkest shade, the apparatus comprising
   A. means for converting said gray scale image into a first corresponding halftone image by converting each pixel value of the gray scale image into one of two opposing extreme pixel values, each extreme pixel value corresponding to the lightest and darkest shade in the range of gray scale levels of the multiple gray scale image,
   B. means for generating an error matrix representative of a difference between each pixel value in the first halftone image and a corresponding pixel value in the gray scale image, and
   C. means for modifying the first halftone image by a pyramidal error convergence for successively larger sized blocks of pixels for a predetermined number of levels, where said means for modifying comprises
      means for calculating a first error average, the first error average being an average of the corresponding pixel values in the error matrix, for each of a plurality of equal sized blocks of pixels in the first halftone image, each block being centered around a preselected pixel position,
      means for calculating, for each said block, a second error average, the second error average representing what the first error average would be if (i) the value of the preselected pixel position in the first halftone image was changed to an opposing extreme pixel value, and a corresponding error value in an error matrix was recalculated accordingly, and
      means for changing, in each said block, the value of the preselected pixel position in the first halftone image to the opposing extreme pixel value if the second error average is less than the first error average.

2. A method for transforming a multiple gray scale image into a halftone image, the multiple gray scale image having a range of gray scale levels including a lightest shade and a darkest shade, the method comprising the steps of:
   A. generating a first halftone image corresponding to said multiple gray scale image by converting each pixel value of the gray scale image into one of two opposing extreme pixel values, each extreme pixel value corresponding to the lightest and darkest shade in the range of gray scale levels of the multiple gray scale image,
   B. generating an error matrix representative of a difference between each pixel value in the first halftone image and a corresponding pixel value in the gray scale image, and
   C. modifying the first halftone image by a pyramidal error convergence means for successively larger sized blocks of pixels for a predetermined number of levels, where each level of the pyramidal error convergence means comprises the further steps of:
      calculating a first error average, the first error average being the average of an corresponding pixel values in the error matrix for each of a plurality of equal sized blocks of pixels in the first halftone image, each block of pixels being centered around a preselected position,
      calculating a second error average, the second error average representing what the first error average would be for each said block if the value of the preselected pixel position in the first halftone image was changed to an opposing extreme pixel value, and a corresponding error value in the error matrix was recalculated accordingly, and
      changing, for each said block, the value of the preselected pixel position in the first halftone image to the opposing extreme pixel value if the second error average is less than the first error average.

3. A method for transforming an array of elements to minimize errors in the array, the method comprising the steps of:
   averaging error values over each of a plurality of equal-sized blocks of elements, each block surrounding and being centered around a preselected element, each preselected element having an associated value,
   changing the associated value of each preselected element if the change results in a lower averaged error value of the block of elements centered around the preselected element, and
   successively repeating the above steps for increasingly larger-sized blocks of elements, with a different set of preselected centered-element positions for each block-size stage.

* * * * *